(No Model.) 2 Sheets—Sheet 1.

T. B. ATTERBURY.
MANUFACTURE OF GLASS FLOWER STANDS.

No. 362,414. Patented May 3, 1887.

WITNESSES
Edwin L. Yewell,
Robt. Alexander

INVENTOR
T. B. Atterbury
By
T. W. Sinsabaugh
Attorney

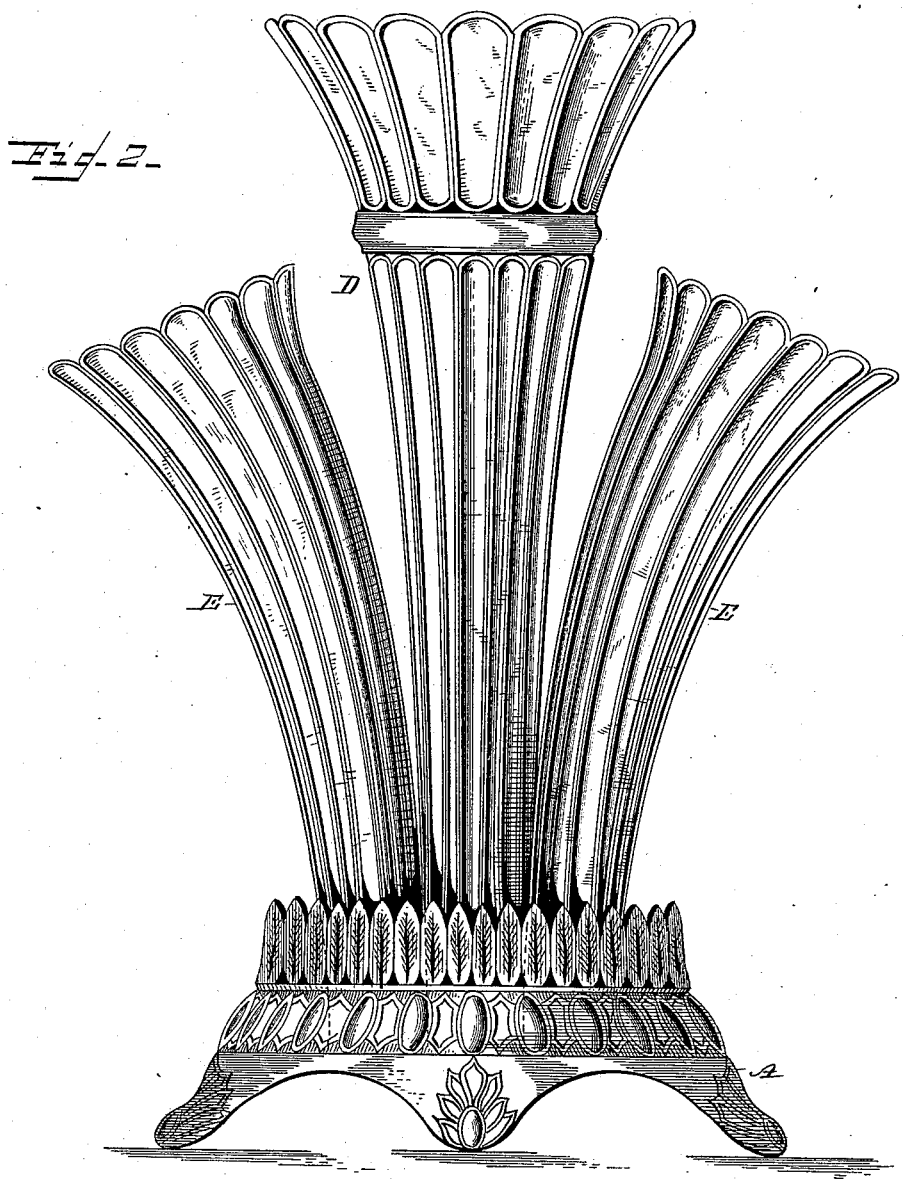

UNITED STATES PATENT OFFICE.

THOMAS B. ATTERBURY, OF PITTSBURG, PENNSYLVANIA.

MANUFACTURE OF GLASS FLOWER-STANDS.

SPECIFICATION forming part of Letters Patent No. 362,414, dated May 3, 1887.

Application filed September 11, 1886. Serial No. 213,297. (No model.)

*To all whom it may concern:*

Be it known that I, THOMAS B. ATTERBURY, a citizen of the United States, residing at Pittsburg, in the county of Allegheny, State of Pennsylvania, have invented certain new and useful Improvements in the Manufacture of Glass Flower-Stands, of which the following is a specification, reference being had therein to the accompanying drawings.

My invention relates to the manufacture of bouquet-holders or flower-stands from glass.

The object of my invention is to provide a bouquet-holder or flower-stand having a series or plurality of detachable holders mounted on a suitable support or base, said base and holders being made of glass and pressed in the usual manner, as will more fully appear.

Figure 1:
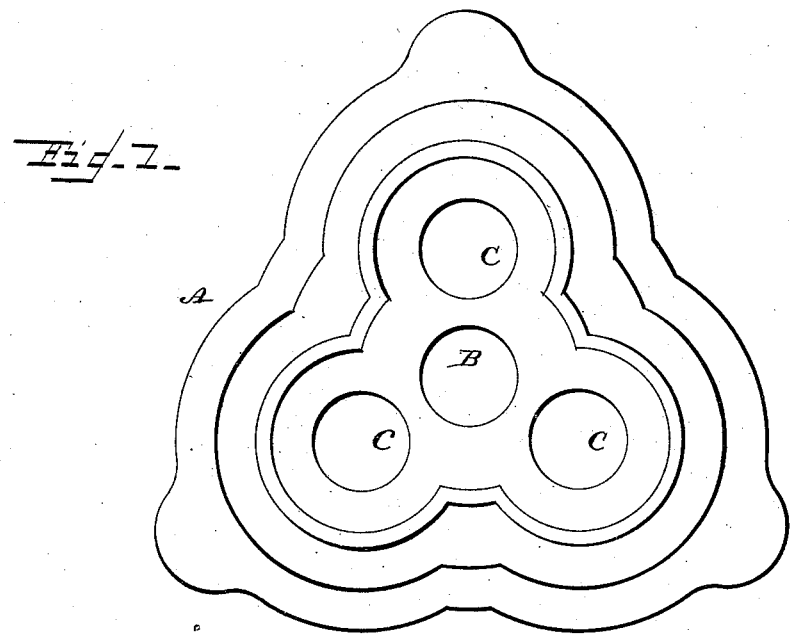
Figure 2:
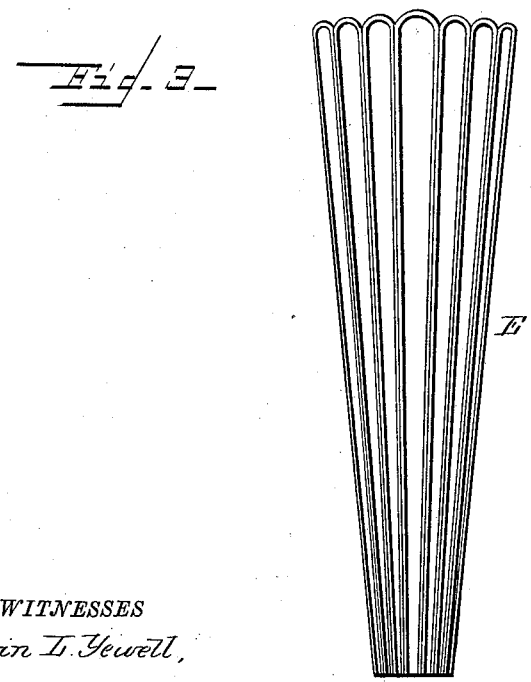

Referring to the drawings, Figure 1 is a top or plan view of the base or support. Fig. 2 is a side view of the base with the flower-holding cups or vases in position for use. Fig. 3 is a side view of one of the smaller vases or cups as it comes from the mold and before it has been curved or shaped.

A indicates the glass base in which the cups or vases for holding the flowers are supported, said base being pressed in any well-known manner and provided with the perforations or cavities B and C, in which the lower ends of the cups or vases D and E are inserted.

D is the central cup or vase, which is by preference made larger than the cups or vases E, is perfectly straight, and adapted to stand in a vertical position in the cavity B.

E are cups or vases made somewhat smaller than the vases D, and adapted to rest in the cavities C, formed in the base A.

The cups or vases D and E are pressed in suitable molds, and may be fluted, beaded, or ornamented in any suitable or desirable manner.

The cups or vases E are by preference curved, as shown in Fig. 2, so their tops will stand out or away from the central cup or vase, D; and in order to produce the curved vases in a cheap and rapid manner I proceed as follows:

As before mentioned, the cups or vases are pressed in molds, and after the cups or vases E have set sufficiently to allow the operator to remove them from the mold they are placed in a snap or other suitable holding-tool and reheated, and while in this condition the operator inserts a piece of wood or other suitable tool and bends the vase to the proper curvature. The base may be provided with any suitable number of cavities or recesses, so that any desired number of vases may be held therein; but I prefer to make them with four cavities, as shown. The exterior of the base may be ornamented with leaves, flowers, scrolls, or flutes, as may be preferred.

The base may be made of glass of any desired color and the vases of another color, so that a stand can be readily made up in colors to suit the taste of the purchaser.

What I claim, and desire to secure by Letters Patent, is—

A bouquet-holder or flower-stand composed of a base, A, a central vertical vase, D, and a series of curved vases, E, arranged around the central vase, as set forth.

In testimony whereof I affix my signature in presence of two witnesses.

THOMAS B. ATTERBURY.

Witnesses:
D. P. BERG,
J. SEAM ATTERBURY.